US011418252B2

(12) United States Patent
Cerovic et al.

(10) Patent No.: US 11,418,252 B2
(45) Date of Patent: Aug. 16, 2022

(54) OMAMRC TRANSMISSION METHOD AND SYSTEM WITH SLOW LINK ADAPTATION

(71) Applicant: ORANGE, Issy-les-Moulineaux (FR)

(72) Inventors: Stefan Cerovic, Chatillon (FR); Abdulaziz Mohamad, Chatillon (FR); Raphael Visoz, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 216 days.

(21) Appl. No.: 16/621,519

(22) PCT Filed: Jun. 6, 2018

(86) PCT No.: PCT/FR2018/000162
§ 371 (c)(1),
(2) Date: Dec. 11, 2019

(87) PCT Pub. No.: WO2018/229362
PCT Pub. Date: Dec. 20, 2018

(65) Prior Publication Data
US 2020/0119804 A1 Apr. 16, 2020

(30) Foreign Application Priority Data

Jun. 12, 2017 (FR) ...................................... 1755212

(51) Int. Cl.
*H04B 7/155* (2006.01)
*H04L 1/00* (2006.01)
(Continued)

(52) U.S. Cl.
CPC ....... *H04B 7/15542* (2013.01); *H04L 1/0003* (2013.01); *H04L 1/0009* (2013.01);
(Continued)

(58) Field of Classification Search
CPC . H04B 7/15542; H04L 1/0003; H04L 1/0009; H04L 1/1864; H04L 1/203; H04L 5/16; H04W 72/0446; H04W 72/082
(Continued)

(56) References Cited

FOREIGN PATENT DOCUMENTS

| CN | 101212285 B | * | 8/2010 |
| CN | 105979562 A | * | 9/2016 |

(Continued)

OTHER PUBLICATIONS globecom.pdf (Year: 2014).*
(Continued)

*Primary Examiner* — Yemane Mesfin
*Assistant Examiner* — Intekhaab A Siddiquee
(74) *Attorney, Agent, or Firm* — David D. Brush; Westman, Champlin & Koehler, P.A.

(57) ABSTRACT

A method for transmitting successive messages forming a frame in a telecommunication system with M sources ($s_1, \ldots, s_M$), L relays and a destination, M>1, L≥1 according to an orthogonal multiple-access scheme of the channel between the M sources and the L relays with a maximum number of $M+T_{max}$ time slots per transmitted frame including M slots and $T_{max}$ cooperative transmission slots. The method includes: a slow type link adaptation determining an initial rate for each source by destination based on an average SNR of each link and transmitting to each source the initial rate; and for each frame out of several, successively transmitting the messages of the M sources during the M slots phase with, respectively, modulation and coding schemes determined from the initial rates. The link adaptation maximizes the aggregate rate of all the sources subject to the constraint of a target average BLER $\varepsilon_{com}$ after $T_{max} \geq X \geq 1$ cooperative transmissions.

13 Claims, 1 Drawing Sheet

(51) Int. Cl.
*H04L 1/18* (2006.01)
*H04L 1/20* (2006.01)
*H04L 5/16* (2006.01)
*H04W 72/04* (2009.01)
*H04W 72/08* (2009.01)

(52) U.S. Cl.
CPC ............ *H04L 1/1864* (2013.01); *H04L 1/203* (2013.01); *H04L 5/16* (2013.01); *H04W 72/0446* (2013.01); *H04W 72/082* (2013.01)

(58) Field of Classification Search
USPC .......................................................... 370/279
See application file for complete search history.

(56) References Cited

FOREIGN PATENT DOCUMENTS

| | | | | |
|---|---|---|---|---|
| WO | WO-2008135833 A2 * | 11/2008 | ........... | H04L 1/0029 |
| WO | WO-2011019924 A1 * | 2/2011 | ........... | H04L 1/1812 |

OTHER PUBLICATIONS

International Search Report dated Oct. 3, 2018 for corresponding International Application No. PCT/FR2018/000162, filed Jun. 6, 2018.

English translation of the Written Opinion of the International Searching Authority dated Oct. 11, 2018 for corresponding International Application No. PCT/FR2018/000162, filed Jun. 6, 2018.

Mohamad Abdulaziz et al., "Cooperative Incremental Redundancy Hybrid Automatic Repeat Request Strategies for Multi-Source Multi-Relay Wireless Networks", IEEE Communications Letters, IEEE Service Center, Piscataway, NJ, US, vol. 20, No. 9, Sep. 1, 2016 (Sep. 1, 2016), pp. 1808-1811, XP011622357.

Mohamad Abdulaziz et al., "Practical Joint Network-Channel Coding Schemes for Slow-Fading Orthogonal Multiple-Access Multiple-Relay Channels", 2014 IEEE Globecom Workshops (GC WKSHPS), IEEE, Dec. 8, 2014 (Dec. 8, 2014), pp. 936-941, XP032747961.

* cited by examiner

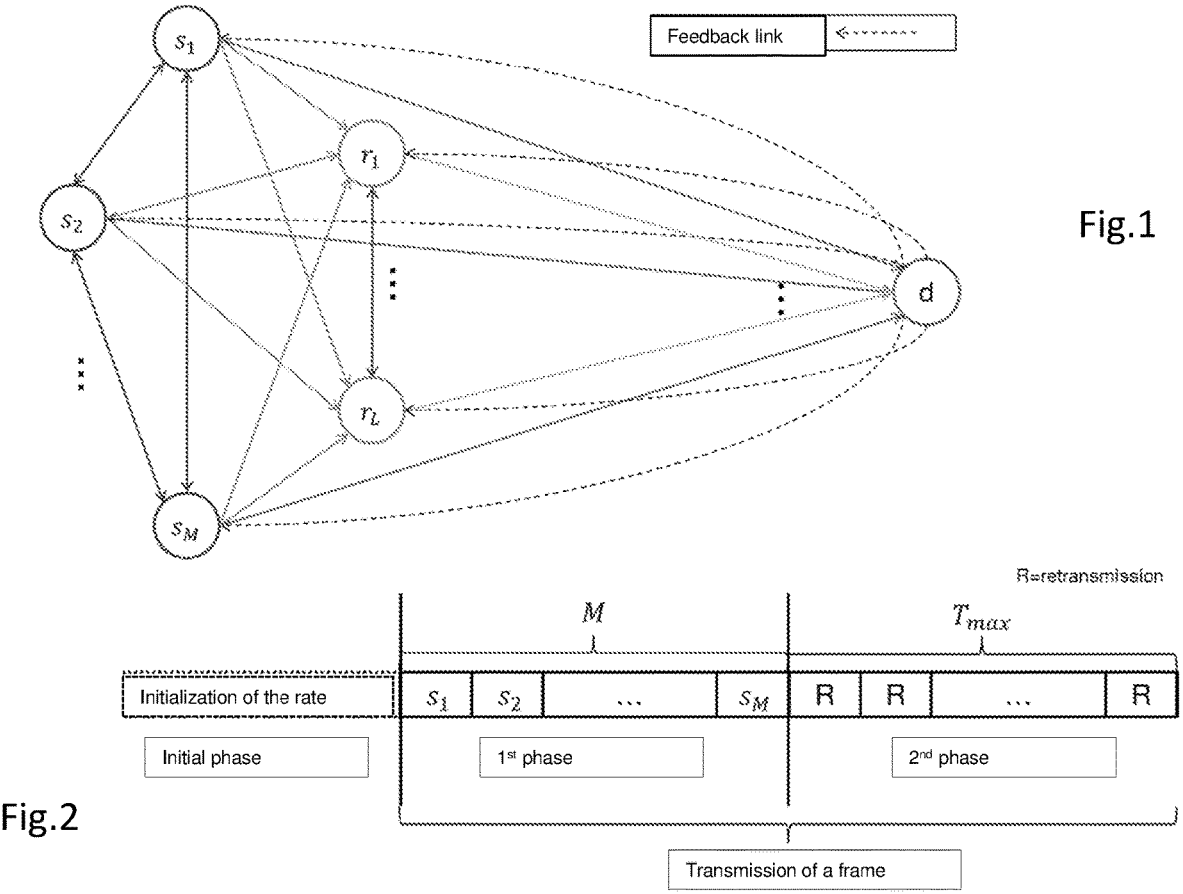
Fig.1
Fig.2
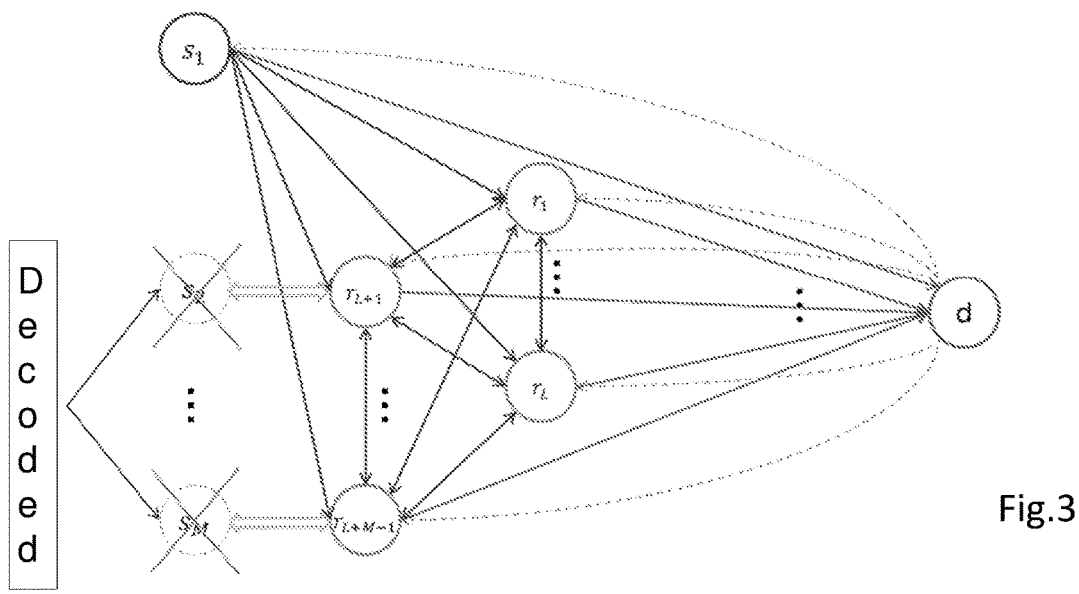
Fig.3

OMAMRC TRANSMISSION METHOD AND SYSTEM WITH SLOW LINK ADAPTATION

CROSS-REFERENCE TO RELATED APPLICATIONS

This Application is a Section 371 National Stage Application of International Application No. PCT/FR2018/000162, filed Jun. 6, 2018, the content of which is incorporated herein by reference in its entirety, and published as WO 2018/229362 on Dec. 20, 2018, not in English.

FIELD OF THE DISCLOSURE

The present invention relates to the field of digital communications. In this field, the invention relates more particularly to the transmission of coded data between sources and a destination with relaying by relays, the relayed communications are said to be cooperative. In the context of the invention, a source can serve as relay after the decoding of the information received from another source. The systems considered comprise multiple sources, one or more relays (a relay possibly being a source) and a destination.

There are numerous relaying techniques known as: "amplify and forward", "decode and forward", "compress-and-forward", "non-orthogonal amplify and forward", "dynamic decode and forward", etc.

The invention applies in particular, but not exclusively, to the transmission of data via mobile networks, for example for real-time applications, or via networks of sensors for example. The network is a multi-user network, composed of multiple sources, multiple relays and a recipient using an orthogonal multiple-access scheme of the transmission channel between the relays and the destination, denoted OMAMRC ("Orthogonal Multiple-Access Multiple-Relay Channel"). The system implements a cooperation strategy called IR-HARQ (Incremental Redundancy Hybrid-ARQ) based on a selective relaying called SDF (Selective Decode and Forward).

In this type of cooperation, the mutually independent sources broadcast their sequences of coded information in the form of messages for the attention of a single recipient and in the presence of relays. The relays of "Half Duplex" (HD, (that is to say that a relay cannot receive and transmit simultaneously)) type receive the messages from the sources, decode them and generate a message solely from the messages from the sources decoded without error. The relays then access the channel mutually orthogonally to transmit their message to the destination. The selectivity of the relays means that a relay transmits a message only if it decodes at least one source without error.

The links between the different nodes of the system are subject to slow fadings and to Gaussian white noise. The state (CSI: Channel State Information) of each direct link with the destination is available to the destination. A limited feedback is allowed from the destination to the sources and to the relays. The retransmission of a source, i.e. of the message from a source, requested in the feedback signal is reflected in the transmission of a redundancy by the relays based on an incremental coding at the sources. There are also control channels for each node to inform the destination of the messages received and correctly decoded.

Such a method is particularly suited to a system deployed in an urban environment in which the transmission channel generally has a profile with so-called Rayleigh fadings. Indeed, such fadings disturb the transmitted signal and are reflected by a non-zero probability of erroneous detection (so-called outage probability).

BACKGROUND OF THE DISCLOSURE

Among the transmission with relaying techniques, known from [1] is a method implementing an IR-HARQ cooperation strategy based on a selective forwarding called SDF. The authors consider an OMAMRC system with M sources, L relays and a destination with a channel-orthogonal access for all the nodes which makes it possible to limit the interferences. The links between the different nodes are subject to slow fadings and to Gaussian white noise. Each relay is distinct from the sources and half-duplex (it cannot receive and transmit at the same time).

The sources code messages of a frame in successive blocks according to a finite incremental redundancy coding.

The transmission of a frame is done in a maximum M+$T_{max}$ time slots divided into two phases.

During the first phase of M time slots, each source transmits its code words during $N_1$ channel uses.

Each time a block is received, a decision module of the relay decides on the messages decoded without error from the messages estimated by testing the CRC (Cyclic Redundancy Check) included in the message, which allows the relay to determine a set of sources correctly decoded.

During the second phase of $T_{max}$ time slots, the destination schedules the node (source or relay) which transmits, at each time slot by using a limited feedback control channel to transmit a feedback message. This feedback message is based on its result of decoding of the frames received. If the decoding of the sources is correct, the feedback is a message of ACK type. If the decoding the sources is incorrect, the feedback message is typically a NACK.

On receipt of common ACK/NACK, the relays transmit their set of correctly decoded sources. The destination then selects the node active in the current slot via a feedback message and, possibly, the set of sources with which the node must cooperate.

The destination thus checks the transmissions of the sources and of the relays by using these feedback messages which makes it possible to improve the spectral efficiency and the reliability by increasing the probability of decoding of all the sources by the destination even though the latter does not know the quality (CSI) of the source-relay and relay-relay links.

The protocol makes it possible to achieve a maximum efficiency by limiting the messages participating in the network coding of a relay to those which have not yet been correctly decoded by the destination. The coding capability of the relay is thus adjusted to what is strictly necessary on each sub-slot according to the feedback from the destination. Furthermore, the link between the relay and the destination is not encumbered by information already known to the destination.

Although the method obtains significant spectral efficiency by virtue of the coding gain and increases the reliability by virtue of the transmission diversity gain, it is considered in Ill that the rates of the sources are symmetrical.

SUMMARY

The subject of the present invention is a method for transmitting successive messages forming a frame in a telecommunication system with M sources, L relays and a destination, M>1, L≥1 according to an orthogonal multiple-access scheme of the transmission channel between the M sources and the L relays with a maximum number of $M+T_{max}$ time slots per transmitted frame including M slots allocated during a first phase to the successive transmission of the M sources, and $T_{max}$ cooperative transmission slots allocated during a second phase to one or more nodes taken from among the sources and the relays according to a determined selection. The method comprises:

- an initial phase of link adaptation with determination of an initial rate for each source by the destination on the basis of an average SNR of each of the links of the system and with transmission to each source of this initial rate,
- for each frame out of several frames, the successive transmissions of the messages of the M sources during the M slots of the first phase with, respectively, modulation and coding schemes determined from the initial rates.

The method is such that the link adaptation is of slow type and consists in maximizing the sum-rate of all the sources subject to the constraint of a target average BLER (prediction based on the probability of outage) $\varepsilon_{com}$ after $X \geq 1$ cooperative transmissions.

The OMAMRC transmission system considered comprises at least one relay and two sources (the relay possibly being one of the sources), each of these sources being able to operate at different instants either as a source, or as a relay. The node-relay terminology equally covers a relay and a source acting as a relay.

The mutually independent sources broadcast their sequences of coded information in the form of messages for the attention of a single recipient. The relays and the sources other than that which transmits, of "Half Duplex" (HD, (that is to say that a source or a relay cannot receive and transmit simultaneously)) type receive the successive messages from the sources, decode them and generate a message solely from the messages from the sources decoded without error. The relay nodes (relays and sources) then access the channel mutually orthogonally during the second phase to transmit their message to the destination. The selectivity of the relay node is such that a relay node transmits a message only if it decodes at least one source without error. The links between the different nodes of the system are subject to slow fadings and to Gaussian white noise. A limited feedback is allowed from the destination to the sources and to the relays. The transmission of a relay node during the second phase is reflected in the transmission of a redundancy based on an incremental coding at the sources.

Contrary to the known transmission techniques with implementation of an IR-HARQ cooperation strategy based on SDF relaying, the method is situated in the context of a system with rates that are asymmetrical between the sources and implements a strategy for maximizing the sum-rate within the system considered. This system is such that the destination has no knowledge of the instantaneous links between the sources and the relays, only of the instantaneous links between the sources and the destination and between the relays and the destination.

Thus, the cooperation strategy according to the invention is such that the sources and the relays cooperate to maximize the aggregate of the rates transmitted between the sources and the destination in a situation closer to reality, i.e. in which there is no symmetry imposed between the rates.

The system considered is such that the sources can themselves be relays. A relay node is distinguished from a source if it has no message to transmit which is specific to it, i.e. it simply retransmits messages originating from other nodes.

The method distinguishes three phases, an initial phase and, for each frame to be transmitted, a $1^{st}$ phase and a $2^{nd}$ phase.

During the initial phase, the destination determines an initial rate for each source by taking account of the average SNR of each of the links of the system. The destination estimates the SNRs of the direct links: source to destination and relay to destination according to known techniques based on the use of reference signals. The quality of the source-source and source-relay links is estimated by the sources and the relays by using these same reference signals. The sources and the relays transmit to the destination the estimated qualities of the links. This transmission takes place before the initialization phase. Since only the average value of the SNR is taken into account, the refreshing thereof occurs on a lengthy timescale, that is to say over a time which makes it possible to average the rapid variations (fast fading) of the channel. This time is of the order of the time needed to travel several tens of wavelengths of the frequency of the transmitted signal for a given speed. The initial phase takes place for example every 200 to 1000 frames. The destination returns to the sources, via a feedback channel, the initial rates determined in order to maximize the average sum-rate of the sources subject to the constraint that the probability of common outage after X cooperative retransmissions is less than or equal to $\varepsilon_{com}$. The average outage probability $\varepsilon_{com}$ can be likened linked to the joint BLER of the sources averaged over the rapid variations of the channel and after X cooperative retransmissions.

During the first phase, the M sources successively transmit their messages during M slots by respectively using modulation and coding schemes determined from the initial rates.

During the $2^{nd}$ phase, the messages from the sources are retransmitted cooperatively either by the relays or by the sources. During this phase, the term retransmissions applies. Indeed, only one additional redundancy can be the subject of this transmission when the coding at the source is of incremental type. The residual BLER for each message transmitted is therefore controlled by performing cooperative (re)transmissions. Each retransmission (by the relays and the sources) corresponds to the sending of additional parity relative to the transmission during the first phase. Since the modulation remains constant, the number of parity bits is determined by the number of the available channel uses (N2 for the network coding, N2/P for P sources decoded correctly at the relay for a distributed coding).

Thus, contrary to the known and widely used techniques, the link adaptation is of slow type and not fast and takes account of a number X of retransmissions. A fast adaptation is based on an instantaneous knowledge of the quality of the channel. According to the invention, the slow adaptation has the advantage of limiting the in-band and out-band occupancy of the control information necessary to this adaptation. The invention also comprises X cooperative retransmissions which makes it possible to take account of the quality of the source-relay and relay-destination links in the choice of the initial rate per source.

According to well-known and widely deployed techniques linked with the LTE (3GPP) standard, the initial value of the MCS is determined to be the greatest possible subject to the constraint of a block error rate BLER that is individual (for each source) which does not exceed $\varepsilon_{ind}=10\%$ by considering that the BLER is averaged relative to the noise. The residual BLER (10%) is, according to these techniques, taken into account in retransmissions which take place after the first transmissions. The BLER according to the LTE is a trade-off between a minimization of the control signals and a maximization of the radio rate from the very first transmissions. The radio rate for the source i is given by $R_i*(1-BLER_i)$ with $R_i$ being the rate and $BLER_i$ being the individual block error rate for a given propagation channel.

Thus, contrary to these widely known and widely used techniques, the initial rates are determined according to the invention not to achieve a maximum BLER of 10% after the first transmissions but after the X≥1 cooperative transmissions.

During the $2^{nd}$ phase, there is if necessary a cooperative transmission by one or by multiple devices taken from among the sources and the relays as chosen by the destination according to a strategy of IR-HARQ type which takes place after the X transmissions.

Thus, the initial rates determined by the destination are reduced slowly to be close to the optimal by using the rounds of the $2^{nd}$ phase so as to achieve a maximum sum-rate with the objective of the destination successfully decoding the message from each source within a reasonable time, i.e. with a limited number Y≥1 of transmissions during the $2^{nd}$ phase.

According to one embodiment, the method is such that the maximization of sum-rate comprises a maximization of the individual rate of each source by considering the messages from the other known sources subject to the constraint of a target individual average BLER $\varepsilon_{com}/M$ after the X cooperative transmissions.

According to one embodiment, the method is such that, after maximization, the M individual rates taken together are increased or reduced simultaneously.

According to one embodiment, the method further comprises, during the $2^{nd}$ phase, after the X cooperative transmissions:
  a cooperative transmission of one or more nodes taken from among the sources and the relays according to a selection of IR-HARQ type.

According to one embodiment, the method is such that the X cooperative transmissions take place according to a selection known by the destination and the relays in advance.

According to one embodiment, the method is such that the selection is determined by the destination and is of IR-HARQ type for all the cooperative transmissions.

According to one embodiment, the method is such that, for any selection of IR-HARQ type, the destination selects the node which maximizes the number of sources decoded correctly after retransmission by this node, the number of sources decoded correctly being derived from a prediction by the destination.

According to one embodiment of the invention, the method for transmitting messages results from a software application subdivided into multiple specific software applications stored in the sources, in the relays and in the destination, a receiver of a base station for example. The execution of these software applications is suitable for the implementation of the transmission method.

Also a subject of the invention is a system comprising M half-duplex sources, L half-duplex relays and a destination, M>1, L≥1, for an implementation of the transmission method according to a preceding subject.

Another subject of the invention is each of the specific software applications on an information medium, said applications comprising program instructions suitable for implementing the transmission method when these applications are executed by processors.

Also a subject of the invention are configured memories comprising instruction codes corresponding respectively to each of the specific applications.

The memory can be incorporated in any entity or device capable of storing the program. The memory can be of ROM type, for example a CD ROM or a microelectronic circuit ROM, or even of magnetic type, for example a USB key or a hard disk.

Also, each specific application according to the invention can be downloaded from a server accessible over a network of internet type.

The optional features presented hereinabove in the context of the transmission method can possibly be applied to the abovementioned application and memory.

The present invention relates also to a communication system comprising at least two sources, a relay and a recipient for the implementation of the subject transmission method.

BRIEF DESCRIPTION OF THE DRAWINGS

Other features and advantages of the invention will become more clearly apparent on reading the following description of embodiments, given as simple illustrative and nonlimiting examples, and the attached drawings, in which:
  FIG. 1 is a diagram of a so-called OMAMRC (Orthogonal Multiple-Access Multiple-Relay Channel) system according to the invention,
  FIG. 2 is a diagram of a transmission cycle of a frame which can be preceded by an initialization step according to the invention,
  FIG. 3 is a diagram of the OMAMRC system of FIG. 1 for which all the sources except the source $s_1$ are considered to be correctly decoded.

DETAILED DESCRIPTION OF ILLUSTRATIVE EMBODIMENTS

A use of the channel is the smallest granularity in terms of time-frequency resource defined by the system which allows the transmission of a modulated symbol. The number of uses of the channel is linked to the available frequency band and to the transmission duration.

In the "slow fading" case prioritized in the description, the fading gains are constant during the $M+T_{max}$ time slots in which $M+T_{max}$ is the maximum number of time slots to accomplish a transmission cycle.

The invention is described in the context of an OMAMRC system illustrated by FIG. 1. This system comprises M sources $\{s_1, \ldots, s_M\}$, L relays $\{r_1, \ldots, r_L\}$ and a destination d.

To simplify the description, the following assumptions are made hereinbelow on the OMAMRC system:
  the sources, the relays are equipped with a single transmission antenna;
  the sources, the relays and the destination are equipped with a single reception antenna;
  the sources, the relays and the destination are perfectly synchronized;
  the sources are statistically independent (there is no correlation between them), they form the set $\mathcal{S} = \{s_1, \ldots, s_M\}$;
  use is made of a CRC code assumed to be included in the $K_{Si}$ information bits of each source $s_i$ to determine whether a message is correctly decoded or not;
  the links between the different nodes suffer from additive noise and from fading. The fading gains are fixed during the transmission of a frame performed during a maximum duration of M+$T_{max}$ time slots, but can change from one frame to another. $T_{max} \geq 2$ is a parameter of the system;

the quality of the direct channel in reception (CSIR, Channel State Information at Receiver) is available to the destination, to the sources and to the relays;

the feedbacks are without error (no error on the control signals);

the duration of the time slots is variable.

The relay nodes comprise the relays and the sources which can behave as a relay when they are not transmitting.

The M sources and the L relay nodes access the transmission channel according to an orthogonal multiple-access scheme which allows them to listen without interference to the transmissions from the other sources and from the other relay nodes.

The destination knows the gains (CSI, Channel State Information) of the direct links $h = \{h_{S_1,D}, \ldots, h_{S_M,D}, h_{R_1,D}, \ldots, h_{R_L,D}\}$, that is to say of the source-to-destination and relay-to-destination links and can therefore deduce therefrom the average SNRs. The sources and the relays transmit to the destination an estimation of the average quality (average SNR) respectively of the links between sources and of the source-to-relay links before the transmission of one or more frames. The destination thus knows all the average SNRs of the system.

During an initial phase which precedes the transmission of multiple frames, the destination returns, for each source, an initial rate or an initial modulation and coding scheme (MCS) determined on the basis of an average SNR of each of the links of the system.

The statistic of the channel of each link is assumed to follow centered circular complex Gaussian distribution and the statistics are independent between the links. It is consequently sufficient to consider only the average SNR as the measure of the statistic of a link.

Each of the initial rates unambiguously determine an initial modulation and coding scheme MCS or, conversely, each initial MCS determines an initial rate.

For example, the set of the MCSs comprises a modulation of BPSK or M-QAM type with {M=4, 16, 64}. For a BPSK modulation, M=2.

The choice of the MCS for the source $s_i$ is such that the modulation makes it possible to map:

$q_i = \log_2 M$ bits/symbol (modulation efficiency).

The MCS set further comprises different coding rates, for example from ⅓ to ⅚. The MCS ($r_i$, $q_i$) chosen for the source $s_i$ comprises the coding rate $r_i$ and the efficiency $q_i$ of the modulation.

If the band available for the transmission for the chosen MCS is $W_i$ then the transmitted symbol rate cannot exceed $W_i \times$[symbols/s] to avoid inter symbol interferences, s is the abbreviation for second.

With each transmitted symbol representing $q_i$ bits, then the data rate cannot exceed $W_i q_i = W_i \log_2 M \times$[bits/s]. Given the use of a forward error correction (FEC), only a portion of the $r_i$ bits is useful, i.e. the information bits. Thus, for a given MCS $q_i$ the data rate is determined by: $r_i = W_i q_i r_i \times$ [bits/s].

For simplification, it is considered hereinbelow that the band allocated for each source is the same and equal to 1 Hz. This means that the data rate for the source $s_i$ is: $R_i = q_i r_i$.

For example, the choice of the modulation of the source $s_i$ is 16-QAM and the coding rate is $r_i = \frac{1}{2}$. Consequently, $$q_i = \log_2 16 = 4 \left[ \frac{\text{bits}}{\text{symbol}} \right]$$

and the data rate of the source $s_i$ is $$R_i = q_i r_i = 2 \left[ \frac{\text{bits}}{s} \right] (W_i = 1 \text{Hz}).$$

Each source transmits its data in frame format to the destination using the other sources and relays.

A frame occupies time slots in the transmission of the M messages from the respectively M sources. The maximum duration of a frame is M+$T_{max}$ time slots. Within one and the same frame, the transmission is divided into two phases.

The first phase comprises M time slots during which the sources $s_i$ each transmit in turn their message to the recipient d. Each time slot has a duration of $N_1$ channel uses.

During this first phase, each source $s_i \in \mathcal{S} = \{s_1, \ldots, s_m\}$ transmits, after coding, a message $u_{s_i}$ comprising $K_{s_i}$ information bits, $u_{s_i} \in \mathbb{F}_2^{K_{s_i}}$, $i \in \{1, \ldots, M\}$, $\mathbb{F}_2$ being the two-element Galois field. The message $u_{s_i}$ comprises a code of CRC type which makes it possible to check the integrity of the message $u_{s_i}$. The message $u_{s_i}$ is coded according to the initial MCS. Given that the initial MCSs can be different between the sources, the lengths of the coded messages can be different between the sources. The coding uses an incremental redundancy code. The code word obtained is segmented into redundancy blocks. The incremental redundancy code can be of systematic type, the information bits are then included in the first block. Whether or not the incremental redundancy code is of systematic type, it is such that the first block can be decoded independently of the other blocks. The incremental redundancy code can be created for example by means of a finite family of rate-compatible punctured linear codes or of codes without rate modified to operate with finite lengths: raptor code (RC), rate-compatible punctured turbo code (RCPTC), rate-compatible punctured convolutional code (RCPCC), rate-compatible low-density parity check code (RCLDPC).

Since each message transmitted corresponds to a source $s_1, \ldots, s_m$, a correctly decoded message is comparable to the corresponding source through a misuse of notation. When a source transmits, the other sources, the relays and the destination listen and try to decode the messages received at the end of each slot. The signal transmitted by the node $a \in \mathcal{S}$ is received by the node $b \in \mathcal{S} \cup \mathcal{R} \cup \{d\}$. The success of the decoding is decided by using the CRC.

The second phase comprises at most $T_{max}$ time slots called rounds. Each round $t \in \{1, \ldots, T_{max}\}$ has a duration $N_2$ channel uses. The $T_{max}$ slots are broken down into X and Y cooperative transmissions: $T_{max} = X+Y$, $X \geq 1, Y \geq 1$.

During the second phase, a relay node transmits, i.e. it cooperates by transmitting the words or a portion of the words that it has correctly decoded.

By convention, the set of messages (or sources) correctly decoded by the node $b \in \mathcal{S} \cup \mathcal{R} \cup \{d\}$ at the end of the slot t (round t), $t \in \{0, \ldots, T_{max}\}$ is denoted $\mathcal{S}_{b,t} \subseteq \mathcal{S}$. The end of the round t=0 corresponds to the end of the first phase.

The X cooperative transmissions can proceed according to a so-called random mode or according to a so-called selection mode. The Y cooperative transmissions proceed according to the so-called selection mode.

According to the so-called random mode, the relay nodes transmit according to a deterministic order determined for example in random form. This mode has the advantage of very greatly limiting the control signals. The selection takes place in the same way in each relay node by using a pseudo-random generator supplied with the same random number between the relay nodes. According to this mode, a source which cooperates during a round can assist either other sources, or itself, or all the sources by transmitting a joint code word.

According to the so-called selection mode, a relay node transmits only if it is solicited by the destination. The destination therefore decides on the number of rounds and consequently on the duration of the second phase. A source selected during this phase therefore acts as a relay. A control signal broadcast by the node $a \in \mathcal{S} \cup \mathfrak{R}$ at the start of the round t identifies the set $\mathcal{S}_{a,t-1} \subseteq \{s_1, \ldots, s_M\}$, $1 \le t \le T_{max}$, of the messages (or sources) correctly decoded by this node at the end of the round t−1. At the end of the first phase, the set of the messages (or sources) correctly decoded by the node $a \in \mathcal{S} \cup \mathfrak{R} \cup \{d\}$ is denoted $\mathcal{S}_{a,0}$. The set $\mathcal{S}_{a,0}$ for $a \in \mathcal{S}$ u $\mathfrak{R}$ is identified in a control signal transmitted by the node $a \in \mathcal{S} \cup \mathfrak{R}$ broadcast at the start of the round t=1. According to this selection mode, the destination d selects the node $\hat{a}_t \in \mathcal{S} \cup \mathfrak{R}$ which transmits in the round t in order to correctly decode a maximum of messages from the sources.

The selection performed by the destination in the current slot (round) t takes account of its knowledge of the gains $h=[h_{s_1,d}, \ldots, h_{s_M,d}, h_{r_1,d}, \ldots, h_{r_L,d}]$, and, in addition, of the knowledge set of its past selections $\{\hat{a}_1, \ldots, \hat{a}_{t-1}\}$ and of the sets of messages decoded correctly by the nodes previously selected (through a misuse of notation comparable to the corresponding sources) $\{\hat{\mathcal{S}}_{a_1,0}, \ldots \hat{\mathcal{S}}_{a_{t-1},t-2}\}$, of the sets of messages $\mathcal{S}_{a,t-1}$ decoded correctly by the nodes $a \in \mathcal{S} \cup \mathfrak{R}$ and transmitted by the latest control signals received and of the sets of messages $\mathcal{S}_{d,t-1}$ decoded correctly by the destination: $\mathcal{P}_{t-1}=\{(\hat{a}_1, \hat{\mathcal{S}}_{a_1,0}), \ldots, (\hat{a}_{t-1}, \hat{\mathcal{S}}_{a_{t-1},t-2})\} \cup \{\mathcal{S}_{a,t-1}, \forall a \in \mathcal{S} \cup \mathfrak{R} \cup \{d\}\}$. By convention, the knowledge set $\mathcal{P}_0$ gathers together only $\{\mathcal{S}_{a,0}, \forall a \in \mathcal{S} \cup \mathfrak{R} \cup \{d\}\}$, that is to say its knowledge of the sets of messages decoded correctly by the sources and the relays at the end of the first phase and its knowledge of the set of messages that it has decoded correctly at the end of the first phase on the basis only of the signals transmitted by the sources.

Let $E_t(a_t, \mathcal{S}_{a_t,t-1}|h, \mathcal{P}_{t-1})$ be the event at the destination conditioned on the knowledge of h and of $\mathcal{P}_{t-1}$ indicating that at least one source is not decoded correctly by the destination at the end of the slot (round) t during which the node $a_t$ is the active node. $\mathcal{S}_{a_t,t-1}$ is the set of the sources assisted by the node $a_t \in \mathcal{S} \cup \mathfrak{R}$. $E_t(a_t, \mathcal{S}_{a_t,t-1}|h, \mathcal{P}_{t-1})$ is called the common probability of incorrect detection (or common outage probability) after the slot (round) t.

Similarly, let $O_{s,t}(a_t, \mathcal{S}_{a_t,t-1}|h, \mathcal{P}_{t-1})$ be the event at the destination conditioned on the knowledge of h and of $\mathcal{P}_{t-1}$ indicating that the source $s \in \mathcal{S}$ is not decoded correctly by the destination at the end of the slot (round) t during which the node $a_t$ is the active node. $\mathcal{S}_{a_t,t-1}$ is the set of the sources assisted by the node $a_t \in \mathcal{S} \cup \mathfrak{R}$. $(a_t, \mathcal{S}_{a_t,t-1}|h, \mathcal{P}_{t-1})$ is called the individual probability of incorrect detection (or individual outage probability) after the slot (round) t.

On each event $A_t(a_t, \hat{\mathcal{S}}_{a_t,t-1}|h, \mathcal{P}_{t-1})$, $A_t$ being either $E_t$ or $O_{s,t}$, there is associated the probability $Pr\{A_t\}$ which can formally be defined as $\mathbb{E}(\mathbf{1}_{\{A_t(\hat{a}_t,\hat{s}_{a_t,t-1}|h,\mathcal{P}_{t-1})\}})$ with $\mathbb{E}(.)$ being the expected value and with $\mathbf{1}_{\{A_t(\hat{a}_t,\hat{s}_{a_t,t-1}|h,\mathcal{P}_{t-1})\}}=1$ if $A_t$ $(\hat{a}_t, \hat{\mathcal{S}}_{a_t,t-1}|h, \mathcal{P}_{t-1})$ is true and equal to zero if not. The probability $Pr\{A_t\}$ depends on the selection rules.

The transmission rate $\bar{R}_i$ achieved in the long term by each source $s_i$, i.e. the number of bits transmitted during the channel uses for a duration which tends toward infinity, can be expressed in the form:

$$\bar{R}_i = \frac{R_i}{M + \alpha \mathbb{E}(T)} \quad (1)$$

with $\alpha=N_2/N_1$ and $\mathbb{E}(T)$ being the average number of cooperative transmissions, $\mathbb{E}(T)=\Sigma_{t=1}^{T_{max}} t Pr\{T=t\}$, T is the number of slots (rounds) conditional on h and on the selection rules. This average number is generally different between the sources since the transmission rates $R_i$ are different between the sources.

The radio rate is generally defined as the rate of the messages transmitted successfully by a transmission channel.

Thus, if the individual outage probability of the source $s_i$ after the maximum number $T_{max}$ of slots (rounds) is equal to $Pr\{O_{s_i}, T_{max}\}$, then the fraction $(1-Pr\{O_{s_i}, T_{max}\})$ of messages must be correctly decoded.

Consequently, the radio rate of the source $s_i$ is equal to:

$$\eta_i = \bar{R}_i(1-Pr\{O_{s_i}, T_{max}\})$$

The long-term aggregate radio rate can be defined as the sum of all the individual radio rates:

$$\eta = \Sigma_{s_i \in \mathcal{S}} \bar{R}_i(1-Pr\{O_{s_i}, T_{max}\}) \quad (2)$$

The spectral efficiency is obtained by dividing the radio rate by the band used $W_i$, this band is taken to be equal to 1 Hz by simplification.

The selection rules therefore consist in maximizing the aggregate rate defined by the equation (2).

According to the so-called random mode, there is no selection by the destination during the duration X. The selection is performed deterministically by using, in the same way for each relay node, a random generator. The destination comprises the same random generator to know the sequence of the selections. Indeed, there is no control signal from the relay nodes to the destination to indicate to it which node to select. If a signal of ACK/NACK type is returned by the destination in the form of a feedback bit ($\mathbf{1}_{\{A_t(\hat{a}_t,\hat{s}_{a_t,t-1}|h,\mathcal{P}_{t-1})\}}$) then the cooperative transmissions are stopped as soon as the bit has the value 1, i.e. corresponds to a common ACK.

According to the so-called selection mode, the destination indicates in feedback the correct decoding of the messages from the sources via the limited control channels. Each source and each relay informs the destination of its set of messages correctly decoded via the forward coordination channels. The destination orders one or more cooperative transmissions as long as the maximum number is not reached to minimize the common outage probability of the system while seeking to maximize the aggregate rate. The selected relay node cooperates by transmitting an item of information taking account of its set of messages correctly decoded.

Two types of relay node are considered hereinbelow to illustrate the common outage probability.

The first type is called DCC/JDCD, distributed channel coding/joint distributed channel decoding. The second type is called JNCC/JNCD, joint network channel coding/joint network channel decoding.

The instantaneous mutual item of information between the node $a \in \mathcal{S} \cup \mathfrak{R}$ which is transmitting and the node $b \in$ $\mathcal{S} \cup \mathfrak{N} \cup \{d\}$ which is receiving is denoted $I_{a,b}$. This mutual item of information depends on the gain of the channel $h_{a,b}$, on the SNR of the link between the nodes a and b and on the assumption of modulation at the channel input. Hereinbelow, h and on $\mathcal{P}_{t-1}$ are omitted in the expressions of $E_t$ and of $O_{s,t}$ to lighten the presentation.

For the DCC/JDCD type, there is no network code, the representative signal transmitted by the selected relay node $\hat{a}_t$ is a concatenation of messages decoded correctly and which each correspond to a correctly decoded source.

The common outage event $E_t(a_t, \mathcal{S}_{a,t-1})$ at the end of the slot (round) t for a selection of a cooperative node $a_t$ can be expressed in the form:

$$E_t(a_t, \mathcal{S}_{a,t-1}) = U_{s \in \bar{\mathcal{S}}_{d,t-1}} \{R_s > I_t^s(a_t, \mathcal{S}_{a_t,t-1})\} \quad (3)$$

with $$I_t^s(a_t, \mathcal{S}_{a_t,t-1}) = \quad (4)$$

$$I_{s,d} + \sum_{l=1}^{t-1} \frac{\alpha}{|\hat{\mathcal{S}}_{a_l,l-1}|} I_{\hat{a}_l,d} 1_{\{s \in \hat{\mathcal{S}}_{a_l,l-1}\}} + \frac{\alpha}{|\mathcal{S}_{a_t,t-1}|} I_{a_t,d} 1_{\{s \in \mathcal{S}_{a_t,t-1}\}}$$

and with $\bar{\mathcal{S}}_{d,t-1} = \mathcal{S} \setminus \mathcal{S}_{d,t-1}$ the complement of $\mathcal{S}_{d,t-1}$ in the set of the sources.

The individual outage event $O_{s,t}(a_t, \mathcal{S}_{a,t-1})$ can be expressed likewise in the form:

$$O_{s,t}(a_t, \mathcal{S}_{a,t-1}) = \{R_s > I_t^s(a_t, \mathcal{S}_{a_l,t-1})\} \quad (5)$$

In the expression (4), $I_{s,d}$ represents the mutual item of information between the source s and the destination d that occurs in the transmission during the first phase. $I_{\hat{a}_l,d}$ represents the mutual item of information between the node $\hat{a}_l$ selected in the slot (round) $l \in \{1, \ldots, t-1\}$ of the second phase and the destination d. This mutual item of information is taken into account only if the source s is successfully decoded by the node $\hat{a}_l$, hence the origin of the function $1_{\{s \in \hat{s}_{a_l,l-1}\}}$. $a_t$ represents the node which will be chosen in the slot (round) t. The division by $|\hat{s}_{a_l,l-1}|$ stems intrinsically from the distributed coding whereby all the available slots of the channel are divided into equal portions and allocated to the individual code words of the distributed code (for example if the distributed code consists of five different code words ($|\hat{s}_{a_l,l-1}|=5$) then each of the code words uses ⅕ of the available channel uses). The multiplication by a is used to normalize before being able to add two mutual items of information generated during two different phases (the transmission takes place during $N_1$ channel uses during the first phase and during $N_2$ channel uses during the second phase).

For a given selection of the cooperative relay node $a_t$ and of the set $\mathcal{S}_{a_t,t-1}$ of the sources with which it cooperates, the individual outage event at the end of the slot (round) t according to the expression (5) means that this event occurs when the rate from the source s is greater than the accumulated mutual information. This mutual information increases after each possible transmission during the second phase (the mutual information at the time t is that at the time t−1 plus the contribution of the cooperative node in the slot (round) t). If this event occurs then this means that the source s cannot be decoded without error.

For the given choice of the cooperative node $a_t$ and of the set $\mathcal{S}_{a_t,t-1}$ of the sources with which it cooperates, the common outage event at the end of the slot (round) t according to the expression (3) occurs if, for at least one source s of the set of the sources decoded without success $\bar{\mathcal{S}}_{d,t-1}$ by the destination at the end of the slot (round) t−1, the accumulated mutual information $I_t^s(a_t, \mathcal{S}_{a_t,t-1})$ from this source s is smaller than its transmission rate $R_s$. This event therefore occurs as soon as a source s cannot be decoded without error.

For the JNCC/JNCD type, the sequence transmitted by the selected relay node $\hat{a}_l$ and the messages transmitted by the sources corresponding to the set $\hat{\mathcal{S}}_{a_l,l-1}$ of the selected sources with which it cooperates form a joined codeword for the messages from the sources $\hat{\mathcal{S}}_{a_l,l-1}$, $l \in \{1, \ldots, t-1\}$. The same applies for the candidate relay node $a_t$ and the set $\mathcal{S}_{a_t,t-1}$ of the selected sources with which it cooperates for the round t.

In this case, there is a declaration of a common outage if the transmission rates vector $(R_1, R_2, \ldots, R_M)$ is in a region external to the region of capacity.

For a backward transmission to M-users, the region of capacity is described by $2^m-1$ inequalities, each corresponding to a subset of the M users. For example, in the case of a backward channel AWGN, these inequalities are:

$$\sum_{k \in W} R_k < \log\left(1 + \frac{\sum_{k \in W} P_k}{N_0}\right) \forall W \subset \{1, \ldots, M\}$$

with $P_k$ the power received by the user k.

The common outage event $E_t(a_t, \mathcal{S}_{a,t-1})$ at the end of the slot (round) t for a selection of a cooperative node $a_t$ is defined in the form of a union of $2^{\bar{\mathcal{S}}_{d,t-1}}$ indicative functions such that this union has the value one if one of the functions is equal to one:

$$E_t(a_t, \mathcal{S}_{a_t,t-1}) = U_{\mathcal{U} \subseteq \bar{s}_{d,t-1}} \mathcal{F}_{d,\bar{s}_{d,t-1}}(\mathcal{U}), \quad (6)$$

in which:

$$\mathcal{F}_{d,\bar{\mathcal{S}}_{d,t-1}}(\mathcal{U}) = \quad (7)$$

$$\left\{\sum_{s \in \mathcal{U}} R_s > \sum_{s \in \mathcal{U}} I_{s,d} + \sum_{l=1}^{t-1} \alpha I_{\hat{a}_l,d} 1_{\{\mathcal{U} \cap \hat{\mathcal{S}}_{a_l,l-1} \neq \emptyset\}} + \alpha I_{a_t,d} 1_{\{\mathcal{U} \cap \mathcal{S}_{a_t,t-1} \neq \emptyset\}}\right\}$$

$I_{s,d}$, $I_{\hat{a}_l,d}$, $I_{a_t,d}$ have the same definition as in the equation (4).

The objective of the arguments of the indicative functions $1_{\{\mathcal{U} \cap \hat{s}_{a_l,l-1} \neq \emptyset\}}$ and $1_{\{\mathcal{U} \cap s_{a_l,t-1} \neq \emptyset\}}$ is to check whether the selected node has succeeded in decoding at least one source of the set $\mathcal{U}$.

The individual outage event $O_{s,t}(a_t, \mathcal{S}_{a,t-1})$ at the end of the slot (round) t for a selection of a cooperative node $a_t$ can be expressed likewise in the form:

$$O_{s,t}(a_t, \mathcal{S}_{a_t,t-1}) = \cap_{\mathcal{X} \subset \bar{s}_{d,t-1}} \cup_{\mathcal{U} \subseteq \bar{\mathcal{X}}: s \in \mathcal{U}} \{\sum_{s \in \mathcal{U}} R_s > \sum_{s \in \mathcal{U}} I_{s,d} + \sum_{l=1}^{t-1} \alpha I_{\hat{a}_l,d} 1_{\{\hat{C}_{l,s}\}} + \alpha I_{a_t,d} 1_{\{C_{t,s}\}}\} \quad (8)$$

in which the sources belonging to $\mathcal{X}$ are considered as interferences, $\bar{\mathcal{X}} = \bar{s}_{d,t-1} \setminus \mathcal{X}$ and $$\hat{C}_{l,s} = \{\{s \in \mathcal{U} \cap \hat{s}_{a_l,l-1}\} \wedge \{\hat{s}_{a_l,l-1} \cap \mathcal{X} = \emptyset\}\}$$

$$C_{t,s} = \{\{s \in \mathcal{U} \cap \mathcal{S}_{a_t,t-1}\} \wedge \{\mathcal{S}_{a_t,t-1} \cap \mathcal{X} = \emptyset\}\}$$

The maximization of the aggregate rates subject to the constraint of the target common outage probability $\varepsilon_{com}$ can thus be expressed in the form:

max $\sum_{i=1}^{|S|} R_i$ subject to the constraint that:

$$Pr\left\{\bigcup_{\mathcal{U} \subseteq S}\left\{\sum_{s \in \mathcal{U}} R_S > \sum_{s \in \mathcal{U}} I_{s,d} + \sum_{l=1}^{X} \alpha I_{\hat{a}_l,d} 1_{\{\mathcal{U} \cap \hat{S}_{a_l,l-1} \neq \emptyset\}}\right\}\right\} \leq \varepsilon_{com} \quad (9)$$

According to one embodiment of the method, the initialization step is based on the assumption that all the sources $\{s_1, s_2, \ldots, s_{i-1}, s_{i+1}, \ldots, s_m\}$ except the source $s_i$ for which there is a desire to initialize the rate are considered to be correctly decoded. The corresponding system is illustrated by the diagram of FIG. 3 when $s_i=s_1$. All the sources $\{s_1, s_2, \ldots, s_{i-1}, s_{i+1}, \ldots, s_m\}$ other than $s_i$ act as relays denoted $\{r_{L+1}, \ldots, r_{L+M-1}\}$. For the source $s_i$ considered, the network is a multiple-relay network denoted (1, L+M−1,1) and no longer a multiple-relay and multiple-user network.

Furthermore, according to this mode, the relay nodes are selected randomly during the X cooperative transmissions.

According to this mode, only the individual outage probabilities are to be considered. The common outage probability can be deduced therefrom directly since the transmissions of the sources are independent, i.e. $\varepsilon_{com}=1-(1-\varepsilon_{ind})^M \approx M\varepsilon_{ind}$.

The target BLER $\varepsilon_{com}$ is declined into M target BLER. For the source for which there is a desire to initialize the rate, the target BLER is assumed less than or equal to $\varepsilon_{com}/M$.

According to this mode, the maximization of the aggregate rates amounts to successively maximizing the rate from each source $s_i$ by considering that the messages from all the other sources have been decoded correctly and that these sources behave only as relays:

$$\max_{R_i} \left\{ \int \left[ R_i > I_{s_i,d} + \sum_{l=1}^{X} \alpha I_{\hat{a}_l,d} 1_{\{s_i \in \hat{S}_{a_l,l-1}\}} \right] P(H) dH \leq \frac{\varepsilon_{com}}{M} \right\} \quad (10)$$

By performing random draws according to a so-called Monte-Carlo method to randomly select the different relay nodes activated during the X cooperative transmissions, it is possible to determine the average value of the integral of the inequality (10) for the candidate rate $R_g$. Thus, to determine the maximum rate that the source $s_i$ can use, the procedure can be as follows:

1. sequentially select the first candidate rate $R_g$ possible which has not yet been considered in the set $\{R_1, \ldots, R_{n_{MCS}}\}$. If all the rates have been considered go to step 10.
2. initialize the counter cnt of the current realization of a Monte-Carlo simulation: cnt=0. Initialization of the counter out of the Monte-Carlo realizations (of matrix of channels H and of X relay nodes) which lead to an outage: out=0.
3. increment the counter cnt by one.
   If cnt≤max_cnt with max_cnt the maximum number of Monte-Carlo realizations, for example max_cnt=1000, then:
   a. randomly determine X relay nodes out of the set $\{r_1, \ldots, r_{L+M-1}\}$ of relay nodes and denote the $r'_x$, $x=\{1, \ldots, X\}$,
   b. determine H on the basis of P(H) the joint probability of the realizations of the channels of all the links $h_{a,b}$.
   If no (cnt>max_cnt) go to step 9.

4. calculate $I_{s_i,d}$ and determine the decoding set of the destination as follows:
   a. if $R_i \leq I_{s_i,d}$ then $\mathcal{S}_{d,0}=\{s_i\}$, return to step 3 (no change of the value of the counter out).
   b. if no ($R_i > I_{s_i,d}$) then $\mathcal{S}_{d,0}=\emptyset$.
5. Initialize the counter of the current round x=1
6. calculate $I_{s_i,r'_x}$. If x>1, calculate $I_{r'_j,r'_x}$ between each of the relays chosen in the preceding round and the relay $r'_x$, $\forall j \in \{1, \ldots, x-1\}$, (by taking into account the decoding set after the round j−1 for the relay $r'_j$).
7. determine the decoding set of the relay $r'_x$ after the round x−1 as follows:
   a. if $$R_i \leq \left( I_{s_i,r'_x} + \sum_{j=1}^{x-1} \alpha I_{r'_j,r'_x} 1_{\{s_i \in S_{r'_j,j-1}\}} \right) \text{ then } S_{r'_x,x-1} = \{s_i\}.$$

b. if no, then $\mathcal{S}_{r'_x,x-1}=\emptyset$.
8. determine the decoding set of the destination after the round x as follows:
   a. if $$R_i \leq \left( I_{s_i,d} + \sum_{j=1}^{x} \alpha I_{r'_j,d} 1_{\{s_i \in S_{r'_j,j-1}\}} \right)$$

then $\mathcal{S}_{d,x}=\{s_i\}$, return to the step 3.
   b. if no, no source is decoded by the destination: $\mathcal{S}_{d,x}=\emptyset$.
      If the maximum number of retransmissions is not reached: x<X then increment x by one and return to step 6.
      If no (x=X) then out=out+1, return to step 3.
9. determine the average outage probability of the source $s_i$ for the rate $R_g$ as being (by solving the integral of the inequality (10) by using the Monte-Carlo simulations):

$$P^{out}_{s_i,R_g} = \frac{out}{max\_cnt}$$

return to step 1.
10. choose the maximum rate $R_i$ that the source $s_i$ can use:

$$R_i = \max R_g \text{ such that } P^{out}_{s_i,R_g} < \frac{\varepsilon_{com}}{M}$$

The steps from 1 to 10 are repeated for each of the other sources $s_i$ to determine each of the rates $R_i$.

The M rates taken together can then be reduced or increased simultaneously by using a Newton method. Thus, if the determination of the left-hand member of the inequality (9) leads to a result greater than or less than the target common outage probability $\varepsilon_{com}$ it is possible to respectively reduce or increase all the rates simultaneously to the rates respectively just below or just above in the case of a finite number of MCSs available. This reduction or increase is repeated until it leads to a result less than the target common outage probability $\varepsilon_{com}$ such that the increasing of the rates leads to a common outage probability greater than $\varepsilon_{com}$.

In the end, the sum of the rates has been maximized subject to the constraint of the target common outage probability $\varepsilon_{com}$.

The common outage probability $\varepsilon_{com}$ can also possibly be refined to tend toward an optimal solution.

The rates having been initialized, for example according to the mode described previously, the sources $s_i$, during the $1^{st}$ phase, each in turn transmit their message with their initial rate to the recipient. On reception, the destination tries to decode the messages received. Generally, not all the messages are decoded correctly by the destination at the end of the first phase, hence the benefit of the $2^{nd}$ phase.

During the $2^{nd}$ phase, there is a cooperative transmission by one or more devices taken from among the sources and the relays. A source can thus cooperate with itself but also with one or more sources.

According to a so-called high signaling load embodiment, the maximization of the rate defined by the equation (1) is obtained by minimizing the common outage probability $\Pr\{E_t\}$ at each round t by selecting the appropriate relay node knowing the channel h and conditional on $P_{t-1}$. Given that, for any source $s \in S$ $\Pr\{O_{s,T_{max}}\} \leq \Pr\{E_{T_{max}}\}$ and that $\Pr\{E_t\} \leq \Pr\{E_{t-1}\}$, then this node should lead to an improvement in the long-term aggregate radio rate given by (2).

According to this mode, if the destination correctly decodes all the messages, it transmits a common ACK message. The transmission of a new frame begins on reception of this ACK. If the destination does not correctly decode all the messages, it transmits a common NACK message in the form for example of a bit at the start of each round $t \in \{1, \ldots, T_{max}\}$. In response, the relay nodes transmit to the destination an update of their set of messages correctly decoded in the form for example of M+L bits. Each relay node can cooperate with its own set of correctly decoded messages. The destination then transmits $\lceil \log_2(M+L) \rceil$ bits for a selection of a cooperative relay node. The selected relay node is the one which minimizes the common outage probability and which, generally, leads to the smallest number of rounds used in this phase. In this way, the long-term transmission rate of each source is increased and consequently the long-term aggregate radio rate is itself also increased. Given the relationships (6) and (7), the selected relay node is the one which minimizes the probability $\Pr\{E_t\}$ of the event $E_t(a_t, \mathcal{S}_{a_t,t-1})$. Which is equivalent to selecting the node which simultaneously maximizes the $(2^{|\bar{S}_{d,t-1}|} - 1)$ quantities of mutual information of the right hand part of the relationship (7). Since the implementation of the selection can be complex, several simple embodiments are described.

A first embodiment considers a common ACK/NACK message and a selection of a relay node based on the mutual item of information.

According to this embodiment, only one subset $\mathcal{U}$ is considered in the equation (6). This subset is that which comprises all the sources of the set of the sources not correctly decoded by the destination, i.e. $\mathcal{U}' = \bar{\mathcal{S}}_{d,t-1}$. Thus, at the start of the round t, the destination chooses the cooperative node $a_t \in a_t \in \mathcal{S} \cup \mathfrak{R}$ which maximizes.

$$\hat{a}_t = \underset{a_t \in \mathcal{S} \cup \mathfrak{R}}{\operatorname{argmax}} \left\{ \sum_{s \in \bar{\mathcal{S}}_{d,t-1}} I_{s,d} + \sum_{l=1}^{t-1} \alpha I_{\hat{a}_l,d} 1_{\{\bar{\mathcal{S}}_{d,l-1} \cap \hat{\mathcal{S}}_{a_l,l-1} \neq \emptyset\}} + \alpha I_{a_t,d} 1_{\{\bar{\mathcal{S}}_{d,t-1} \cap \mathcal{S}_{a_t,t-1} \neq \emptyset\}} \right\} = \underset{a_t \in \mathcal{S} \cup \mathfrak{R}}{\operatorname{argmax}} \left\{ I_{a_t,d} 1_{\{\bar{\mathcal{S}}_{d,t-1} \cap \mathcal{S}_{a_t,t-1} \neq \emptyset\}} \right\} \quad (11)$$

Given that the choice of $a_t$ does not influence the first two terms of the right hand part of the inequality (7), then the problem of maximization can be transformed into a maximization of the third term:

$$\alpha I_{a_t,d} 1_{\{\mathcal{U} \cap \mathcal{S}_{a_t,t-1} \neq \emptyset\}}.$$

Such a choice of $\mathcal{U}'$ amounts to performing a selection of the node with the item of information $I_{a_t,d}$ that is the greatest out of all the nodes which are capable of decoding at least one source out of the set of the sources not decoded correctly by the destination. This choice guarantees that, in all the inequalities in which $\mathcal{U} \cap \mathcal{S}_{a_t,t-1} \neq \emptyset$ (for all $\mathcal{U}$ other than $\mathcal{U}'$), the selected node is also the best.

A second embodiment considers a common ACK/NACK message and a selection of a relay node based on the product of mutual information and on the cardinality of the decoding set.

According to this embodiment, the selection concerns the node with the greatest product $I_{a_t,d} \times |\mathcal{S}_{a_t,t-1}|$. The product is a good joint indicator of the mutual item of information $I_{a_t,d}$ and of the cardinality of the decoding set $|\mathcal{S}_{a_t,t-1}|$.

A third embodiment considers a common ACK/NACK message and a selection of a relay node based on a prediction of the decoded sources.

According to this embodiment, on each round, the destination sequentially examines the sources from $s_1$ to $s_M$ and then the relays from $r_1$ to $r_L$. For each node $a_t$ out of these nodes and on condition that $\bar{\mathcal{S}}_{d,t-1} \cap \mathcal{S}_{a_t,t-1} \neq \emptyset$ the destination tries to determine how many more sources it could decode of the preceding round if this node were selected.

To this end, for each of these nodes $a_t$, the destination checks for each source $s_i \in \bar{\mathcal{S}}_{d,t-1}$ whether the individual outage event $O_{s,t}(a_t, \mathcal{S}_{a_t,t-1})$ after the round t is true or not. Next, the destination counts the number of the individual outage events equal to zero (i.e. false) to obtain the number of sources that can be newly correctly decoded. The destination then chooses the node $a_t$ which leads to the greatest number of newly decoded sources. If several nodes lead to the same number, the destination chooses one of them randomly.

According to an alternative that is less costly in terms of number of operations, the destination checks the common outage events of the subset of the decoding set $\bar{\mathcal{S}}_{d,t-1}$.

For a set of sources to be the decoding set $\mathcal{S}_d$ of the destination, the following must apply: (i) the channel access of the $|\mathcal{S}_d|$—users by considering the sources of $\mathcal{S} \setminus \mathcal{S}_d$ as interferences must not be in common outage mode and (ii) for all the subsets $\mathcal{S}'_d$ which include $\mathcal{S}_d$ ($\mathcal{S}_d \subset \mathcal{S}'_d$), the channel access by the $|\mathcal{S}'_d|$—users must be in outage mode. $\mathcal{B}_j^{(i)}$ is the $j^{th}$ subset of $\bar{\mathcal{S}}_{d,t-1}$ of cardinality i with $$j \in \left\{ 1, \ldots, \binom{|\bar{\mathcal{S}}_{d,t-1}|}{i} \right\}$$

(there is a total of $$\binom{|\bar{\mathcal{S}}_{d,t-1}|}{i}$$

subsets of cardinality i in the set $\bar{\mathcal{S}}_{d,t-1}$).

According to this alternative, the destination starts from the greatest subset of the decoding set $\bar{S}_{d,t-1}$ denoted $\mathcal{B}_1^{(|\bar{S}_{d,t-1}|)}$. Then it checks whether the common outage event after the round t is true or not. If it is false, this means that this subset is the decoding set: $\mathcal{B}_1^{(|\bar{S}_{d,t-1}|)} = \bar{S}_{d,t-1}$ i.e. the number of sources newly decoded by choosing the node $a_t$ is: $v(a_t) = |\bar{S}_{d,t-1}|$. If the common outage event is true, the observed set $\mathcal{B}_1^{(|\bar{S}_{d,t-1}|)}$ reduced by one source, starting from the source $s_1$, and the destination checks whether the same event for the new subset $\mathcal{B}_1^{(|\bar{S}_{d,t-1}|-1)} = \bar{S}_{d,t-1} \backslash s_1$ is true or not. As long as the event is true, the check is performed for another subset $\mathcal{B}_j^{(|\bar{S}_{d,t-1}|-1)} = \bar{S}_{d,t-1} \backslash s_j$ with $j \in \{2, \ldots, |\bar{S}_{d,t-1}|\}$.

If there is at least one subset $\mathcal{B}_j^{(|\bar{S}_{d,t-1}|-1)}$, $j \in \{1, \ldots, |\bar{S}_{d,t-1}|\}$ for which the common outage event is false, then $v(a_t) = |\bar{S}_{d,t-1}| - 1$. If not, then observed set $\mathcal{B}_1^{(|\bar{S}_{d,t-1}|)}$ is reduced by two sources or the subset $\mathcal{B}_j^{(|\bar{S}_{d,t-1}|-1)}$ reduced sequentially by one source of the set $\bar{S}_{d,t-1}$ to obtain the subsets $\mathcal{B}_{j'}^{(|\bar{S}_{d,t-1}|-2)}$, $$j' \in \left\{1, \ldots, \binom{|\bar{S}_{d,t-1}|}{2}\right\}.$$

If there is at least one subset $\mathcal{B}_{j'}^{(|\bar{S}_{d,t-1}|-2)}$ for which the common outage event is false, then $v(a_t) = |\bar{S}_{d,t-1}| - 2$. If not, the observed set is reduced by three sources and the common outage event is checked and so on for the observed subsets of cardinality $\bar{S}_{d,t-1} - n$, $n=4, 5, \ldots$ . In the worst case, the cardinality of the observed subsets $\mathcal{B}_j^{(1)}$ $j \in \{1, \ldots, |\bar{S}_{d,t-1}|\}$ is one and $v(a_t)=1$ or 0.

Checking (ii) whether the common outage event is true for the subsets $\mathcal{B}$ of the set $\bar{S}_{d,t-1}$ ($\forall \mathcal{B} \subseteq \bar{S}_{d,t-1}$) of the sources not decoded by destination is equivalent to checking whether the rate vector of this subset is located outside of the region of capacity of the backward link of the $|\mathcal{B}|$-users. The consideration of the region of capacity of the $|\mathcal{B}|$-users accessing, by a multiple access to the channel ($|\mathcal{B}|$-user MAC), entails considering other sources of interference. The set of interference sources is denoted $\mathcal{I} = \bar{S}_{d,t-1} \backslash \mathcal{B}$. A multiple access to the channel with the subset $\mathcal{B}$ of sources by considering the other sources as interferences is hereinafter denoted $|\mathcal{B}|$-user reduced MAC. The expressions (6) and (7) cannot be used to calculate the common outage event of the subset $\mathcal{B}$ since no set of interfering sources is considered here. Indeed, the expressions (6) and (7) relate to the region of capacity of the complete set $\bar{S}_{d,t-1}$, i.e. $|\bar{S}_{d,t-1}|$-users in multiple channel access mode ($|\bar{S}_{d,t-1}|$user MAC). The expression to be taken into account for the common outage event of the subset $\mathcal{B}$ is as follows:

$$E_{t,\mathcal{B}}(a_t S_{a_t,t-1}) = \bigcup_{\mathcal{U} \subseteq \mathcal{B}} \mathcal{F}_{d,\mathcal{B}}(\mathcal{U}), \quad (12)$$

$$\mathcal{F}_{d,\mathcal{B}}(\mathcal{U}) = \left\{\sum_{s \in \mathcal{U}} R_s > \sum_{s \in \mathcal{U}} I_{s,d} + \sum_{l=1}^{t-1} \alpha I_{\hat{a}_l,d} 1_{\{\hat{C}_{l,s}\}} + \alpha I_{a_t,d} 1_{\{C_{t,s}\}}\right\} \text{ with}$$

$$\hat{C}_{l,s} = \{\{s \in \hat{S}_{a_l,t-1} \cap \mathcal{U}\} \wedge \{\hat{S}_{a_l,t-1} \cap \mathcal{I} = \phi\}\} \quad (13)$$

$$C_{t,s} = \{\{s \in S_{a_t,t-1} \cap \mathcal{U}\} \wedge \{S_{a_t,t-1} \cap \mathcal{I} = \phi\}\}$$

In other words, according to this alternative, the destination performs the following operations:

1. initialization of a variable i denoting the cardinality of the observed set $\mathcal{B}$ at: $i=|\bar{S}_{d,t-1}|$. For each relay node $a'_t \in \{s_1, \ldots, s_M, r_1, \ldots, r_L\}$ initialize $v(a'_t)=0$.

2. sequentially, take the next potential candidate cooperating node $\alpha_t$ not yet considered of the set $\{s_1, \ldots, s_m, r_1, \ldots, r_L\}$ and for which $\bar{S}_{d,t-1} \cap S_{a_t,t-1} \approx \emptyset$. If the node $r_L$ has been considered, then go to the step 5. If not, go to the next step.

3. at the round i calculate the function $E_{t,\mathcal{B}_j^{(i)}}(a_t, S_{a_t,t-1})$ for each $$j \in \left\{1, \ldots, \binom{|\bar{S}_{d,t-1}|}{i}\right\}$$

by using the relationships (14) and (15).

4. if $E_{t,\mathcal{B}_j^{(i)}}(a_t, S_{a_t,t-1})=1$ for each $$j \in \left\{1, \ldots, \binom{|\bar{S}_{d,t-1}|}{i}\right\}$$

then:
   a. if i>1 decrease i and return to step 3.
   b. if i=1 return to step 2 ($v(\alpha_t)$ remains equal zero).
   If not, if $E_{t,\mathcal{B}_j^{(i)}}(a_t, S_{a_t,t-1})=0$ for at least one value of j declare that $v(a_t)=i$ and return to step 2.

5. all the candidate nodes $a_t$ having been considered, take the one $a^*_t$ which maximizes the number of sources newly decoded by the destination compared to the preceding round:

$$a^*_t = \underset{a_t \in \{s_1, \ldots, s_M, r_1, \ldots, r_L\}}{\arg\max} v(a_t)$$

If there is more than one node at which maximizes the function, then randomly choose a node from among these nodes.

For each of the three high signaling load embodiments, the number of signaling bit (feedback) per round for the common ACK/NACK message and the node selection message is at most: $c_1 = \lceil \log_2(M+L) \rceil + 1$.

According to a so-called low signaling load embodiment, the selection of the nodes for the X first rounds is determined randomly in advance. Each of the nodes of the network uses a random generator with one and the same random number. Thus, there is no feedback signaling conveying node selection information from the destination to the cooperative nodes which makes it possible to reduce the bandwidth occupied by the signaling, in particular by comparison to the mode with high signaling load. Two simple implementations are described.

A first implementation with random selection considers that there is no common ACK/NACK message at the end of each of the X rounds. Thus, whether or not the destination has decoded the sources before the end of a round, there is cooperation of the randomly selected relay node. In a $1-\varepsilon_{com}$ percentage of cases, there is no signaling interchange during the $2^{nd}$ phase.

A second implementation with random selection takes account of a common ACK/NACK message at the end of each of the X rounds to stop the cooperation in case of ACK and switch over to a new frame. According to this implementation, a correct decoding of all the sources by the destination can therefore make it possible to stop the cooperative transmissions at the cost of one signaling bit per round.

REFERENCES

[1] A. Mohamad, R. Visoz and A. O. Berthet, "Cooperative Incremental Redundancy Hybrid Automatic Repeat Request Strategies for Multi-Source Multi-Relay Wireless Networks," in IEEE Communications Letters, vol. 20, no. 9, pp. 1808-1811, September 2016

Although the present disclosure has been described with reference to one or more examples, workers skilled in the art will recognize that changes may be made in form and detail without departing from the scope of the disclosure and/or the appended claims.

The invention claimed is:

1. A transmission method comprising:
   transmitting successive messages forming a frame in a telecommunication system with M sources ($s_1, \ldots, s_M$), L relays ($r_1, \ldots, r_L$) and a destination (d), M >1, L ≥1 according to an orthogonal multiple-access scheme of the transmission channel between the M sources and the L relays with a maximum number $M+T_{max}$ time slots per transmitted frame including M slots allocated during a first phase to the successive transmission of the M sources, and $T_{max}$ cooperative transmission slots allocated during a second phase to one or more nodes taken from among the sources and the relays according to a determined selection, wherein the transmitting comprises:
   an initial phase of link adaptation comprising determining an initial rate for each source by the destination on the basis of an average Signal to Noise Ratio (SNR) of each of the links of the system and transmitting to each source the initial rate,
   for each frame out of several frames, successively transmitting the messages of the M sources during the M slots of the first phase with, respectively, modulation and coding schemes determined from the initial rates,
   wherein the link adaptation comprises maximizing an aggregation of rates transmitted between the sources and the destination subject to a constraint of a target average Block Error Rate (BLER) after X ≥1 cooperative transmissions, and
   wherein the selection at a slot t of a node ($a_t$) out of the nodes having correctly decoded at the slot t−1 at least one source (s) that the destination has not correctly decoded at this slot t−1, is determined by the destination by taking account of the gains ($h=[h_{s_1,d}, \ldots, h_{s_M,d}, h_{r_1,d}, \ldots, h_{r_L,d}]$) of the channels between the nodes and the destination.

2. The transmission method as claimed in claim 1, wherein the maximization of the aggregation of rates comprises a maximization of an individual rate of each source by considering the messages from other sources known subject to the constraint of a target individual average BLER after the X cooperative transmissions.

3. The transmission method as claimed in claim 2, wherein, after maximization, the M individual rates taken together are increased or reduced simultaneously.

4. The transmission method as claimed in claim 1, wherein the selected node ($a_t$) is that for which the channel with the destination exhibits the best gain.

5. The transmission method as claimed in claim 1, wherein the X cooperative transmissions occur according to a selection known by the destination and the relays in advance.

6. The transmission method as claimed in claim 1, wherein the selection is determined by the destination according to an Incremental Redundancy Hybrid-Automatic Repeat Request (IR-HARQ), cooperative strategy for all the cooperative transmissions.

7. The transmission method as claimed in claim 6, wherein, for any cooperative transmission, the destination selects the node which maximizes the number of sources decoded correctly after the cooperative transmission by this node, the number of sources correctly decoded being derived from a prediction by the destination.

8. The transmission method as claimed in claim 1, wherein the maximization of the aggregation of rates comprises a maximization of an individual rate of each source by considering the messages from other sources known and the relaying nodes selected randomly subject to the constraint of a target individual average BLER after the X cooperative transmissions.

9. A transmission method comprising:
   transmitting successive messages forming a frame in a telecommunication system with M sources ($s_1 \ldots, s_M$), L relays ($r_1 \ldots, r_L$) and a destination (d), M>1, L≥1 according to an orthogonal multiple-access scheme of the transmission channel between the M sources and the L relays with a maximum number $M+T_{max}$ time slots per transmitted frame including M slots allocated during a first phase to the successive transmission of the M sources, and $T_{max}$ cooperative transmission slots allocated during a second phase to one or more nodes taken from among the sources and the relays according to a determined selection, wherein the transmitting comprises:
   an initial phase of link adaptation comprising determining an initial rate for each source by the destination on the basis of an average Signal to Noise Ratio (SNR) of each of the links of the system and transmitting to each source the initial rate,
   for each frame out of several frames, successively transmitting the messages of the M sources during the M slots of the first phase with, respectively, modulation and coding schemes determined from the initial rates,
   wherein the link adaptation comprises maximizing an aggregation of rates transmitted between the sources and the destination subject to a constraint of a target average Block Error Rate (BLER) after X≥1 cooperative transmissions and
   wherein the method further comprises, during the second phase after the X cooperative transmissions:
   a cooperative transmission of one or more nodes taken from among the sources and the relays according to a selection according to an Incremental Redundancy Hybrid-Automatic Repeat Request (IR-HARQ) cooperative strategy.

10. The transmission method as claimed in claim 9, wherein, for any selection after the X cooperative transmissions, the destination selects the node which maximizes the number of sources decoded correctly after cooperative transmission by this node, the number of sources correctly decoded being derived from a prediction by the destination.

11. A telecommunication system comprising:
   M sources ($s_1, s_M$), half-duplex;
   L relays ($r_1, r_L$), half-duplex; and a destination (d), M>1, L≥1, with link adaptation, wherein the destination comprises a processor configured to:

receive successive messages forming a frame transmitted in the telecommunication system according to an orthogonal multiple-access scheme of the transmission channel between the M sources and the L relays with a maximum number M+$T_{max}$ time slots per transmitted frame including M slots allocated during a first phase to the successive transmission of the M sources, and $T_{max}$ cooperative transmission slots allocated during a second phase to one or more nodes taken from among the sources and the relays according to a determined selection, wherein the receiving comprises:

an initial phase of link adaptation comprising determining an initial rate for each source by the destination on the basis of an average Signal to Noise Ratio (SNR) of each of the links of the system and transmitting to each source the initial rate, for each frame out of several frames, successively receiving the messages of the M sources during the M slots of the first phase with, respectively, modulation and coding schemes determined from the initial rates, and wherein the link adaptation comprises maximizing an aggregation of rates transmitted between the sources and the destination subject to a constraint of a target average Block Error Rate (BLER) after X≥1 cooperative transmissions, and wherein the selection at a slot t of a node ($\alpha_t$), out of the nodes having correctly decoded at the slot t−1 at least one source (s) that the destination has not correctly decoded at this slot t−1, is determined by the destination by taking account of the gains (h=[$h_{s_1,d}$, ..., $h_{s_M,d}$, $h_{r_1,d}$, ..., $h_{r_L,d}$]) of the channels between the nodes and the destination.

12. A destination device in a telecommunication system comprising M sources ($s_1$, ..., $s_M$), half-duplex; L relays ($r_1$, ..., $r_L$), half-duplex; and the destination device, M>1, L≥1, wherein the destination comprises:

a processor configured to:

receive successive messages forming a frame transmitted in the telecommunication system according to an orthogonal multiple-access scheme of the transmission channel between the M sources and the L relays with a maximum number M+$T_{max}$ time slots per transmitted frame including M slots allocated during a first phase to the successive transmission of the M sources, and $T_{max}$ cooperative transmission slots allocated during a second phase to one or more nodes taken from among the sources and the relays according to a determined selection, wherein the receiving comprises:

an initial phase of link adaptation comprising determining an initial rate for each source by the destination on the basis of an average Signal to Noise Ratio (SNR) of each of the links of the system and transmitting to each source the initial rate, for each frame out of several frames, successively receiving the messages of the M sources during the M slots of the first phase with, respectively, modulation and coding schemes determined from the initial rates, wherein the link adaptation comprises maximizing an aggregation of rates transmitted between the sources and the destination subject to a constraint of a target average Block Error Rate (BLER) after X≥1 cooperative transmissions and wherein the selection at a slot t of a node ($\alpha_t$), out of the nodes having correctly decoded at the slot t−1, at least one source (s) that the destination has not correctly decoded at this slot t−1, is determined by the destination by taking account of the gains (h=[$h_{s_1,d}$, ..., $h_{s_M,d}$, $h_{r_1,d}$, ..., $h_{r_L,d}$]) of the channels between the nodes and the destination.

13. A destination device in a telecommunication system comprising M sources ($s_1$, ..., $s_M$), half-duplex; L relays ($r_1$, ..., $r_L$), half-duplex; and the destination device, M>1, L≥1, wherein the destination comprises:

a processor configured to:

receive successive messages forming a frame transmitted in the telecommunication system according to an orthogonal multiple-access scheme of the transmission channel between the M sources and the L relays with a maximum number M+$T_{max}$ time slots per transmitted frame including M slots allocated during a first phase to the successive transmission of the M sources, and $T_{max}$ cooperative transmission slots allocated during a second phase to one or more nodes taken from among the sources and the relays according to a determined selection, wherein the receiving comprises:

an initial phase of link adaptation comprising determining an initial rate for each source by the destination on the basis of an average Signal to Noise Ratio (SNR) of each of the links of the system and transmitting to each source the initial rate, for each frame out of several frames, successively receiving the messages of the M sources during the M slots of the first phase with, respectively, modulation and coding schemes determined from the initial rates, wherein the link adaptation comprises maximizing an aggregation of rates transmitted between the sources and the destination subject to a constraint of a target average Block Error Rate (BLER) after X≥1 cooperative transmissions, and wherein the method further comprises, during the second phase after the X cooperative transmissions:

a cooperative transmission of one or more nodes taken from among the sources and the relays according to a selection according to an Incremental Redundancy Hybrid-Automatic Repeat Request (IR-HARQ), cooperative strategy.

* * * * *